United States Patent Office 2,775,588
Patented Dec. 25, 1956

2,775,588

SUBSTITUTED AZACYCLOALKANES AND PROCESS OF PRODUCING THEM

Julius Diamond, Philadelphia, and William F. Bruce, Havertown, Pa., assignors to American Home Products Corporation, New York, N. Y., a corporation of Delaware No Drawing. Original application January 5, 1954, Serial No. 402,397, now Patent No. 2,740,779, dated April 3, 1956. Divided and this application June 28, 1955, Serial No. 518,652

3 Claims. (Cl. 260—239)

This invention relates to the preparation of cyclic compounds and more particularly to the preparation of acyl azacycloalkanes. The present application is a division of application Serial No. 402,397, filed January 5, 1954, now Patent No. 2,740,779.

The compounds falling within the scope of the invention are specific members of the more general group of compounds disclosed and claimed in application Serial No. 297,185, filed July 3, 1952, now Patent No. 2,666,050. The present compounds may be represented by the general formula

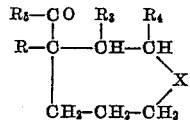

wherein >X stands for either >N—R₁ or

with $R_1$ representing a lower alkyl and $R_2$ standing for either hydrogen or an alkyl while A is an anion, R standing for an aryl group and with $R_3$ and $R_4$ each standing for hydrogen or lower alkyl and $R_5$ representing a lower alkyl group.

With regard to R which represents an aryl radical, the latter may be either a substituted or unsubstituted phenyl ring. Preferred substituents on a ring which may be in any position and ranging from 1 to 3 are lower alkyl, lower alkoxy, halogen, nitro, hydroxy, aliphatic acyl and acyloxy, amino and mono and di-lower alkyl-substituted amino radicals. As will be indicated later, an especially preferred radical because it imparts valuable therapeutic action to the compound is the m-hydroxy phenyl radical. In general, the compounds of the invention may be made in the manner disclosed in the earlier filed application Serial No. 297,185. A general procedure for making specific 4-acyl compounds utilizes the cyano compound obtained from reaction 3 disclosed in said earlier case. In such general procedure, an ether solution of the alkyl magnesium halide is prepared from 0.070 g.-atom of magnesium metal and 0.075 mole of alkyl halide in 100 ml. of dry ether. To this solution is added dropwise 0.05 mole of the appropriate 4-cyano compound in 100 ml. of toluene. The temperature is maintained, with stirring, at 25–35° C. during the addition. On its completion, the temperature is gradually raised by distilling off the ether. A maximum temperature of 65–85° C. is maintained for 6 hours. The mixture is cooled and extracted with dilute hydrochloric acid. The acid extract is washed with ether, then basified with ammonium hydroxide, and finally extracted with chloroform. The chloroform extract is dried over anhydrous sodium sulfate, filtered and concentrated. Vacuum distillation of the residue gives the desired aminoketone base.

Acid addition salts of the cyclic bases may be made in well known manner as disclosed in application Serial No. 297,185 by reacting the appropriate base with the desired inorganic or organic carboxylic acid. Preferred acids are those mentioned in said prior application. These cyclic bases are also capable of reacting with alkyl halides on an equimolar basis under normal conditions to form quaternary ammonium compounds.

The reaction is carried out in the presence of inert solvent.

For a more specific description of the process, the following reactions illustrate the formation of the specific compound 4-propionyl-4-m-hydroxyphenyl-1-methyl-azacycloheptane.

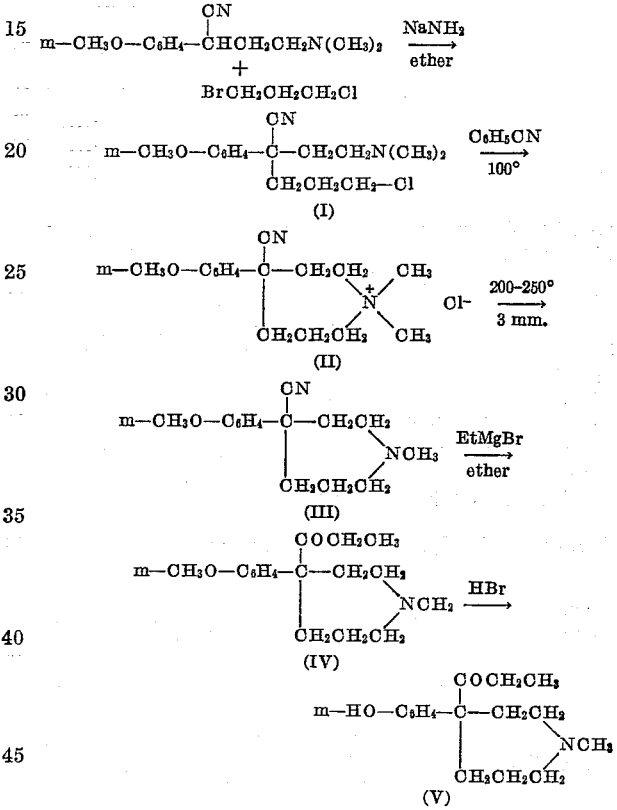

*4-cyano-4-m-methoxyphenyl-N-methylazacycloheptane methochloride (Compound II)*

A solution of 0.181 mole (39.5 g.) of 2-(m-methoxyphenyl)-4-dimethylamino-butyronitrile in 250 ml. of ether was added to a stirred suspension of 0.217 mole (8.5 g.) of sodamide in 250 ml. of ether at such a rate as to maintain gentle refluxing. The operations were carried out in a nitrogen atmosphere. Refluxing and stirring were continued for 2 additional hours. The mixture was cooled to −30° C., and 0.199 mole (31.5 g.) of trimethylene chlorobromide in 100 ml. of ether was added dropwise at −25° C. to −15° C. while stirring. The mixture was then allowed to warm to room temperature and stand overnight. The precipitated inorganic salts were filtered off and the ether distilled from the filtrate at reduced pressure. The yellow liquid residue contained the 1,6-amino-chloride (I). This was dissolved in 180 ml. of benzonitrile and the resulting solution heated at 100° C. for 20 hours. The mixture was cooled, 180 ml. of acetone added, and the precipitated quaternary salt (II) was filtered off after standing 4 hours. M. P. 212–213° C. dec.

*Analysis.*—Calcd. for $C_{16}H_{23}ClN_2O$: C, 65.20; H, 7.86; N, 9.51; Cl, 12.03. Found: C, 65.15; H, 7.73; N, 9.51; Cl, 12.18.

4-cyano-4-m-methoxyphenyl-N-methylazacycloheptane (Compound III)

Into a small Claisen flask set up for distillation, was placed 0.085 mole (25 g.) of the quaternary salt (II). After evacuating the system to 1–3 mm., heat was applied using an air-bath. At a bath temperature of 200–250° C. a liquid distilled over at 170–210° C. Redistillation gave the cyano base (III), B. P. 150–154° C. (0.3 mm.), $n_D^{22}$ 1.5332, $d_4^{22}$ 1.062.

Analysis.—Calcd. for $C_{15}H_{20}N_2O$: C, 73.70; H, 8.25; N, 11.46; $M_D$ 71.18. Found: C, 74.27; H, 8.58; N, 11.12; $M_D$ 71.40.

4-propionyl-4-m-methoxyphenyl-N-methylazacycloheptane (Compound IV)

Ethyl magnesium bromide was prepared from 0.09 g.-atom (2.2 g.) of magnesium metal and 0.10 mole (10.9 g.) of ethyl bromide in 150 ml. ether. To this solution was added, with stirring, 0.0573 mole (14 g.) of the cyano base (III) in 150 ml. of ether at such a rate as to maintain gentle refluxing. After 5 additional hours of stirring and refluxing, the mixture was allowed to stand overnight. The cooled mixture was extracted with aqueous hydrochloric acid, the acid extract basified with ammonium hydroxide, extracted with ether, and the ether extract dried, filtered, and concentrated under reduced pressure. A light yellow liquid residue remained which contained the crude ketobase (IV).

4-propionyl-4-m-hydroxyphenyl-N-methylazacycloheptane (Compound V)

The above Compound IV was used without further purification. It was dissolved in 100 ml. of 48% hydrobromic acid. The solution was heated to reflux and kept at this temperature (110–125° C.) for 17 hours. The cooled solution was treated with 230 ml. of 4 N-sodium hydroxide solution and the resulting solution washed with ether. The aqueous alkaline solution was saturated with carbon dioxide to precipitate an oil which was extracted with chloroform. The extract was dried, filtered, and distilled. At 190–200° C. (0.3 mm.) 3.3 g. of a yellow viscous syrup distilled over. On cooling the material became glassy. It was dissolved in boiling ether, filtered, and the filtrate concentrated to a small volume. On standing at room temperature, the product (V) appeared as white crystals. The mixture was filtered, the crystals washed with petroleum ether, and air-dried. M. P. 135–6° C.; purple color with aqueous-alcoholic ferric chloride solution.

Analysis.—Calcd. for $C_{16}H_{23}NO_2$: C, 73.50; H, 8.86; N, 5.36. Found: C, 73.92; H, 9.05; N, 5.53.

Other compounds falling within the scope of the invention are given in the following table with identifying characteristics. The various radicals R, $R_3$, $R_4$ and $R_5$ are specific species of the general formula given hereinbelow.

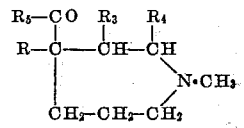

| R | $R_3$ | $R_4$ | $R_5$ | B. P. (0.3 mm.), degrees | $n_D$ (° C.) | derivative, M. P. |
|---|---|---|---|---|---|---|
| $C_6H_5$ | H | H | $C_2H_5$ | 132-6 | 1.5302 (26°) | methiodide, 217-9° d. hydrochloride, 122-5°. |
| $C_6H_5$ | H | H | n-$C_3H_7$ | 132-3 | 1.5300 (26°) | picrate, 138-40°. |
| $C_6H_5$ | H | $CH_3$ | $C_2H_5$ | 135-42 | 1.5350 (27.5°) | methiodide, 183-5°. |
| $C_6H_5$ | $CH_3$ | H | $C_2H_5$ | 133-42 | 1.5400 (27°) | picrate, 164-5° d. |

The cyclic free bases are useful for the formation of quaternary ammonium compounds since they readily react with an alkyl halide, particularly the long chain alkyl halides, to form valuable wetting agents. These bases or their acid-addition salts are also capable of reacting with penicillin to form substantially water-insoluble salts thereof. In addition, many of the bases or their salts demonstrate varying degrees of analgesic action and thus are useful therapeutics.

We claim:

1. The compound selected from the group consisting of an azacycloheptane having the formula

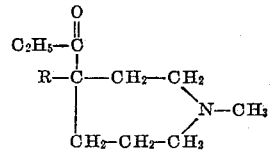

and the acid-addition salts thereof; wherein R is a radical selected from the group consisting of m-methoxyphenyl and m-hydroxyphenyl.

2. The compound 4-m-methoxyphenyl-4-propionyl-1-methylazacycloheptane.

3. The compound 4 - m-hydroxyphenyl-4 - propionyl-1-methylazacycloheptane.

References Cited in the file of this patent

UNITED STATES PATENTS 2,666,050    Diamond et al. _____ Jan. 12, 1954